US007128313B1

(12) United States Patent
Pliley

(10) Patent No.: US 7,128,313 B1
(45) Date of Patent: Oct. 31, 2006

(54) SUPPORT SYSTEM OF A TABLETOP VISE

(76) Inventor: Larry E. Pliley, 469 Newark St., Aurora, CO (US) 80010

( * ) Notice: Subject to any disclaimer, the term of this patent is extended or adjusted under 35 U.S.C. 154(b) by 0 days.

(21) Appl. No.: 11/365,739

(22) Filed: Feb. 28, 2006

(51) Int. Cl.
*B23Q 3/02* (2006.01)

(52) U.S. Cl. .......................................... 269/95; 269/43

(58) Field of Classification Search .................. 269/95, 269/43, 242, 195, 268, 247, 329
See application file for complete search history.

(56) References Cited

U.S. PATENT DOCUMENTS

| | | | | |
|---|---|---|---|---|
| 2,889,757 A * | 6/1959 | Cole | .......................... | 33/538 |
| 5,595,378 A * | 1/1997 | Martinsson et al. | ........ | 269/210 |
| 6,595,508 B1 * | 7/2003 | Duncan | ...................... | 269/242 |
| 6,640,666 B1 | 11/2003 | Pliley | | |
| 2003/0071405 A1 * | 4/2003 | Miksovsky | .................. | 269/95 |
| 2004/0004318 A1 * | 1/2004 | Degen | ......................... | 269/95 |

* cited by examiner

*Primary Examiner*—Lee D. Wilson
(74) *Attorney, Agent, or Firm*—Ramon L. Pizarro; Edwin H. Crabtree

(57) ABSTRACT

A vise and base system is disclosed. The vise includes a stationary jaw, a frame with a frame perimeter wall and a moveable jaw, the stationary jaw being fixed to the frame, and the moveable jaw that is movable along the frame. The vise cooperates with a hollow base that includes a first recessed area that is adapted for mating with the frame perimeter wall and a second recessed area that is adapted for mating with the stationary jaw. The base also includes a base panel that is attached to the base perimeter wall and a layer of flexible high friction material that is attached to the base panel, such that the base can support the vise in a generally horizontal position and in a generally vertical position.

8 Claims, 4 Drawing Sheets

SUPPORT SYSTEM OF A TABLETOP VISE

BACKGROUND OF THE INVENTION (a) Field of the Invention

This application relates to a system for supporting a vise while in use. More particularly, but not by way of limitation, to a system that includes a vise and a support base that supports the vise in an upright position as well as in a horizontal position.

(b) Discussion of Known Art

In my U.S. Pat. No. 6,640,666, incorporated herein in its entirety by reference, I disclose a vise for securely holding a work piece such as a watch, delicate jewelry, or any other small, delicate item that needs to be solidly retained to allow work to be performed on the item. After working with the vise it became apparent that while the jaws and inserts use with my vise provide the needed secure grip of the work piece, there was a need for providing a sturdy support for the vise that was easy to use and would allow the use of the vise at any location on a variety of work surfaces.

The typical approach at supporting a vise is the use of a clamp or mechanical fasteners that fix the position of the vise at the edge of a workbench or other support surface. While this approach provides the steady support needed to allow the user of the vise to exert force on the work piece without having the vise move away from the force, it lacks versatility, convenience and flexibility, especially for light applications, such as train or airplane model building, soldering of electronic components, and crafts. For example, often a work piece must be positioned such that appropriate lighting or heating of the work piece can be provided. The use of traditional methods for supporting a vise would dictate that the lighting or heating be designed around the vise, due to the fixed location of the vise. Thus there remains a need for a system that can be easily used in areas where one must improvise a work area, such as where the user has limited space and must use a kitchen table as a work surface, for example.

Still further, the fixed location of known mounting methods also forces the user to move around the vise and work piece. Thus, there remains a need for a system that allows movement, flexibility, angular adjustability of the vise, and then secure, stable support for the vise without having to bolt down or clamp down the vise at its new location.

As explained in my U.S. Pat. No. 6,640,666, it was originally contemplated that my vise could be used with an optional base with a recess into which the vise portion could be inserted. The base portion as envisioned then also included a layer of skid-resistant material mounted on the bottom surface of the base in order to provide skid-resistance and stability for the vise system on most flat, regular surfaces. This original iteration of the base also further served to organize and/or carry various jaw accessories such as adapters and other utensils. This original iteration provided a convenient receptacle for work pieces, but was not designed for providing a steady support for a vise and thus not capable of resisting vise workload.

The base disclosed in my U.S. Pat. No. 6,640,666 proved to be very useful in storing the vise, but limited in its ability to provide the versatility and support needed while performing many common tasks, such as sawing, grinding, or pressing items together. I discovered that the base would flex and slide when pushing down on the work piece while sawing or grinding. While, making the base from a solid, non-hollow, single piece construction would help reduce the flexing, this construction would be too heavy and expensive.

Additionally, the design disclosed in my above-referenced patent was limited in that it only allowed me to mount and/or hold the vise in a horizontal position, with the jaws opening upwards, as shown in that patent. The need to press items together required that I support the vise in a vertical position, with the stationary jaw being positioned near the support surface, between the movable jaw and the support surface. Such a position would allow the user to rest the item against the feature that it is to be pressed into, and then use the movable jaw to squeeze the items together. Furthermore, the vertically mounted vise allowed the work piece to be held along a horizontal plane, which is highly useful when working on circuit boards, for example.

Still further, I often had to work on delicate, detailed items that required a very steady hand. This meant that the vise or support had to allow me to hold items at a level that allowed me to rest my hand or forearm on the table top while working on the work piece. Known devices that had to be mounted from the protruding edge of the bench did not allow me to gain this support for my arms and hands from the bench.

Therefore, a review of known devices reveals that there remains a need for a simple system for supporting a small vise on a tabletop, bench-top or other flat or generally flat surface.

There remains a need for a support base for a vise, the support base cooperating with the vise to allow support of the vise in various horizontal working locations to allow the vise to perform clamping functions as well as other functions, such as acting as a press.

There remains a need for a vise and base support system that provides sturdy retention of the vise while in use on various surfaces, without the need for mechanical fastening devices, such as bolts, screws, or lever action suction cups. Importantly, suction cups will not function properly on uneven or coarse surfaces. The unevenness of these surfaces will prevent the suction cups from maintaining the proper vacuum, and thus will lose their grip on the surface. The loss of vacuum by suction cups is a common problem even on smooth surfaces. Dirt or any other foreign matter on the work surface will result in a loss of vacuum and a loss of grasp of the surface.

SUMMARY

It has been discovered that the problems left unanswered by known art can be solved by providing a vise and base system that includes:

a vise having a stationary jaw, a frame with a frame perimeter wall and a moveable jaw, the stationary jaw being fixed to the frame, and the moveable jaw being slideable along the frame, the stationary jaw having a stationary jaw perimeter surface that extends away from the frame;

a hollow base, the base having a base perimeter wall and an upper surface, the upper surface having a first recessed area that is adapted for mating with the frame perimeter wall by producing a first interference fit between the frame perimeter wall and the hollow base, and a second recessed area that is adapted for mating with the jaw perimeter surface by producing a second interference fit between the hollow base and the jaw perimeter;

a base panel that is attached to the base perimeter wall, such that the upper surface and the base panel are spaced apart; and a layer of flexible high friction material attached to the base panel such that the base panel extends between the upper surface and the layer of flexible high friction material, so that the first recessed area supports the vise in a generally horizontal position, and the second recesses area supports the vise in a generally vertical position.

According to a highly preferred embodiment of the invention, the first recessed area and the second recessed area are coextensive, with a portion of the second recessed area extending from the first recessed area. With this arrangement, a support base with a rather small footprint against the layer of high friction material that can still support the vise in both a horizontal and vertical position is created. It is desirable to reduce the footprint over the layer of high friction material in order to make full use of the well-known rule of frictional force: $F=N\mu$, where N is the normal force and $\mu$ is the coefficient of friction for the material. Thus, reduction of the size of the footprint increases the force per unit area of the material. Also, the close proximity and low plane of the working plane allows the user to lightly press down on the base with one hand to prevent sliding, while using the fingers of the same hand to steady the other hand that is being used to perform the work.

It is contemplated that the hollow base will be made from a single sheet of molded plastic material, molded as a single concave unit that incorporates the first recessed area and the second recessed area. It is preferred that the first recessed area and the second recessed area will extend from the upper surface towards the base panel. It has been discovered that this arrangement creates a particularly rigid structure that allows even distribution of the weight of the vise, and any forces exerted on items being held on the vise, to the layer of flexible high friction material, allowing the material to develop a particularly effective grip on whatever surface is being used to support the system.

It is contemplated that the flexible high friction material may be a rubbery or rubber-like polymer that provides a high friction coefficient to the vise. The flexibility may be imparted by using a foam material or simply using a highly flexible material, which may contain features, such as protrusions or recesses, that facilitates the flexing of the flexible high friction material and its contact with the tabletop.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
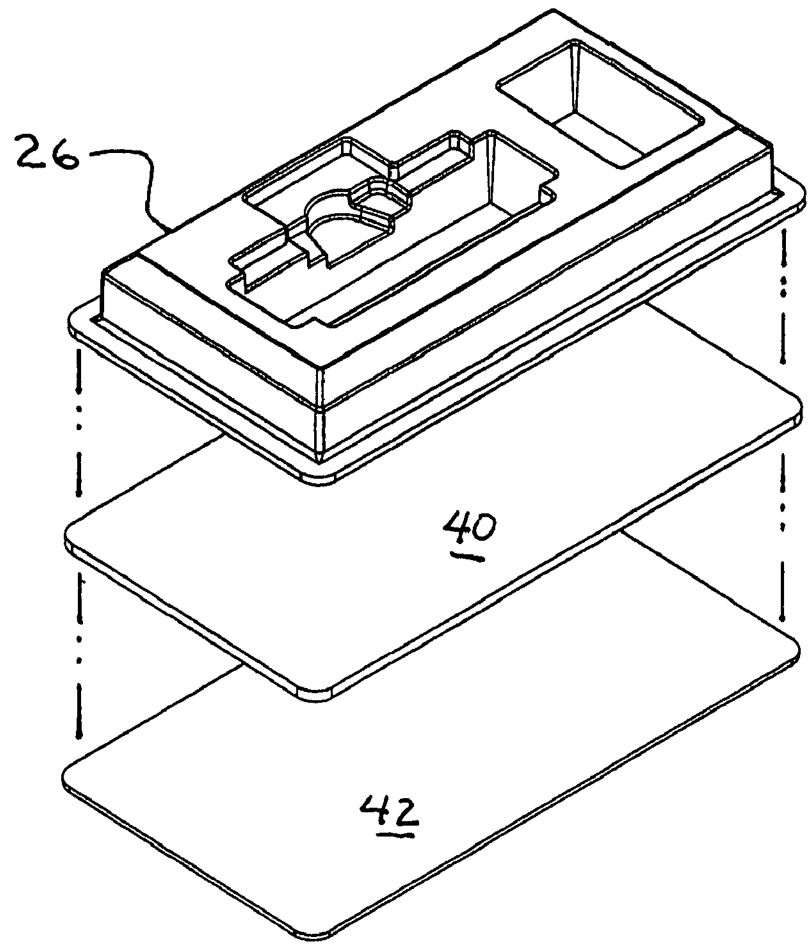
FIG. 1 is a perspective view of an embodiment of the base component.
Figure 4:
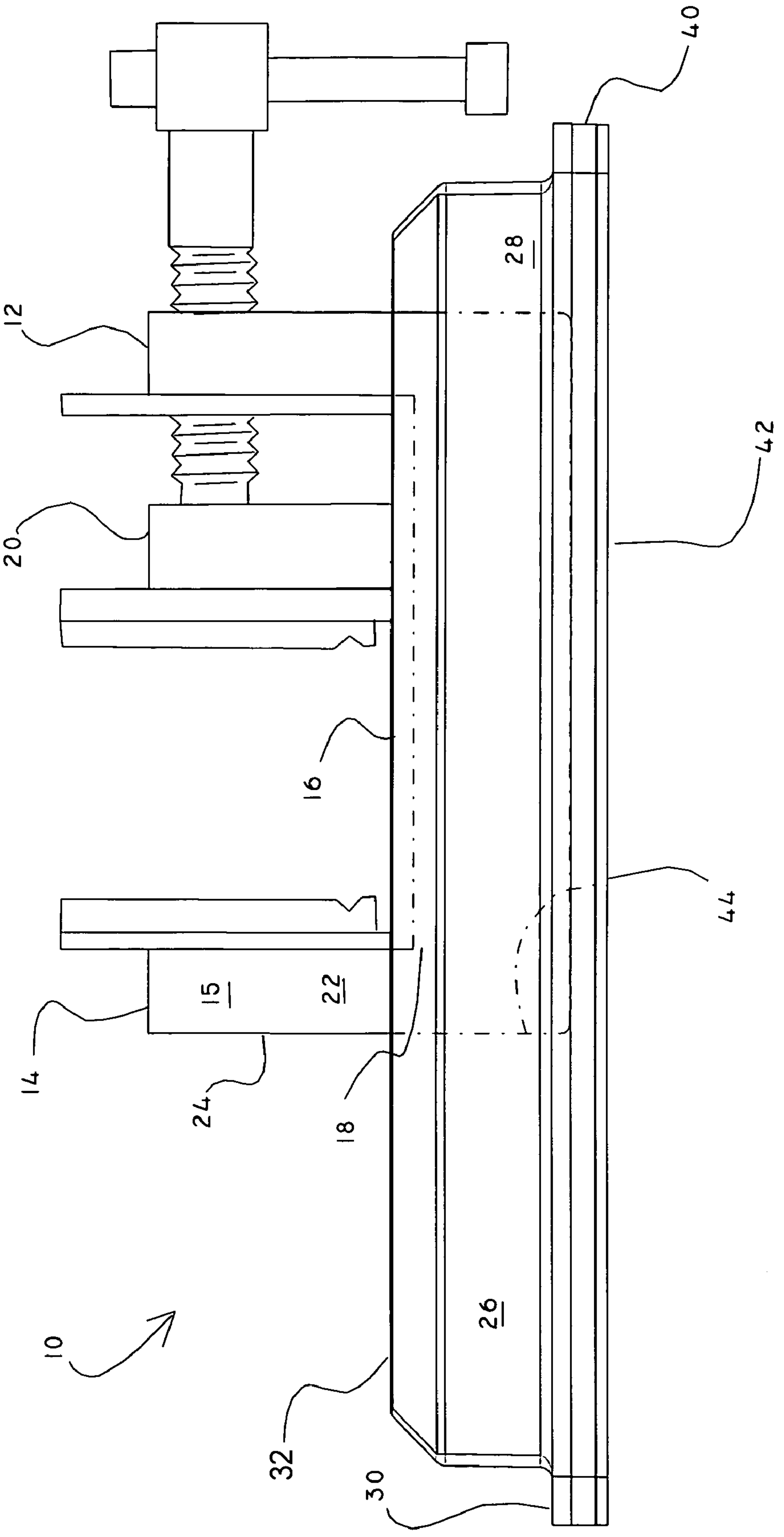
FIG. 4 is a side view of base, showing my invention with the vise shown supported in a horizontal position.
Figure 5:
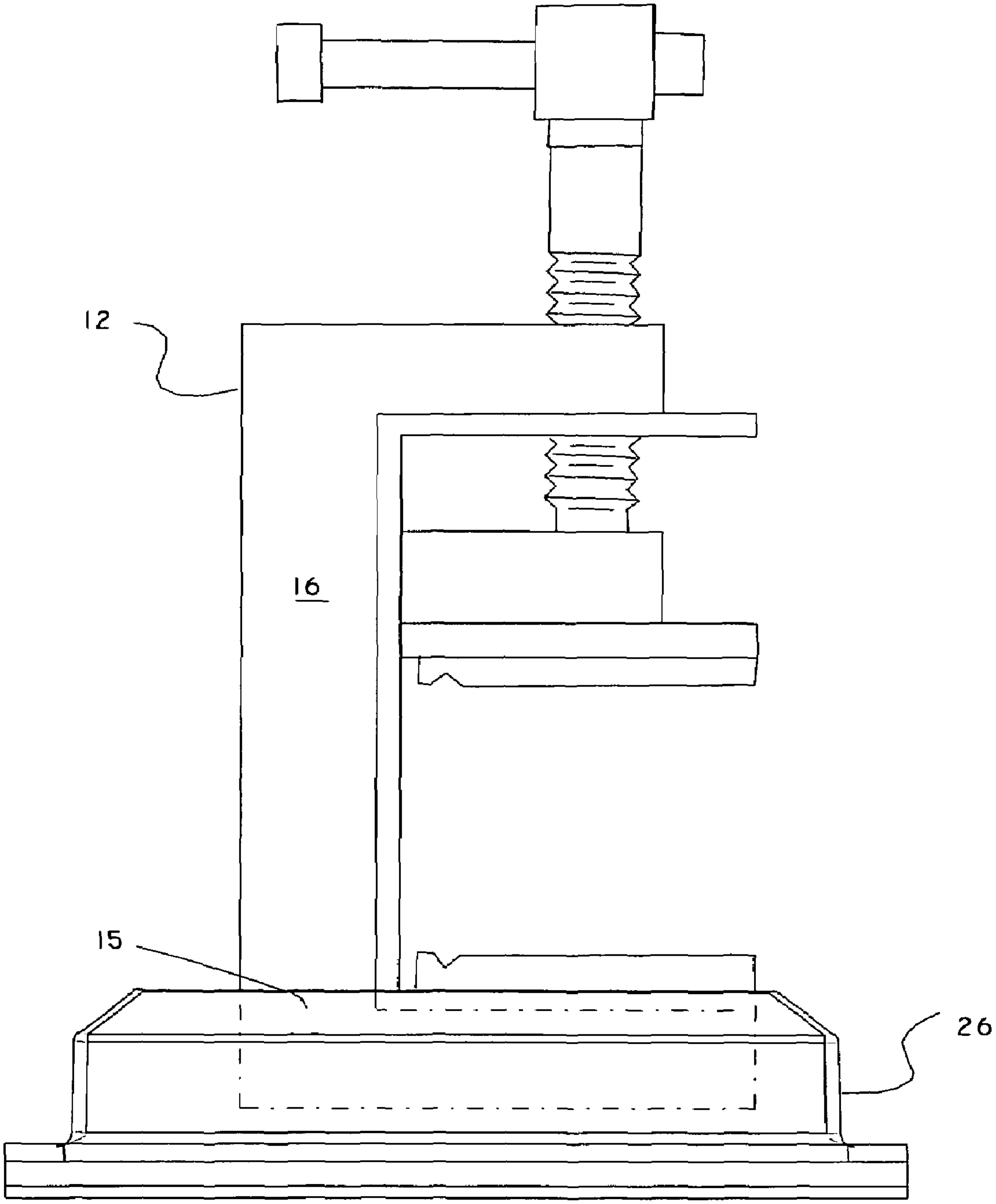
FIG. 5 is a side view of the base with my vise being supported in a vertical position.

Turning now to FIGS. 1, 4 and 5 where a highly preferred example of a vise and base system 10 as disclosed herein has been illustrated. The vise 12, which is also disclosed in my U.S. Pat. No. 6,640,666, includes a stationary jaw 14. The stationary jaw 14 is mounted at fixed location on a frame 16. The frame 16 includes a frame perimeter wall 18, and also supports a moveable jaw 20. The moveable jaw 20 is moved along the frame 16 towards the stationary jaw 14 by way of a screw mechanism. As illustrated, the stationary jaw 14 includes a stationary jaw perimeter surface 15 that includes stationary jaw sides 22 and a stationary jaw end 24 that extend away from the frame 16.

Turning to FIG. 1 it will be understood that the system 10 includes a hollow base 26 that includes a base perimeter wall 28. The base perimeter wall terminates in a planar flange 30 that extends away from the base perimeter wall 28, and preferably follows the entire base perimeter wall 28. Additionally, it is contemplated that the base perimeter wall 28 will terminate in an upper surface 32 that is spaced apart from the planar flange 30. FIGS. 1–5 illustrate that in a preferred embodiment the hollow base 26 is contiguous, with the first recessed area 34 and the second recessed area 36, such that do not extend through the hollow base 26.

Figure 3:
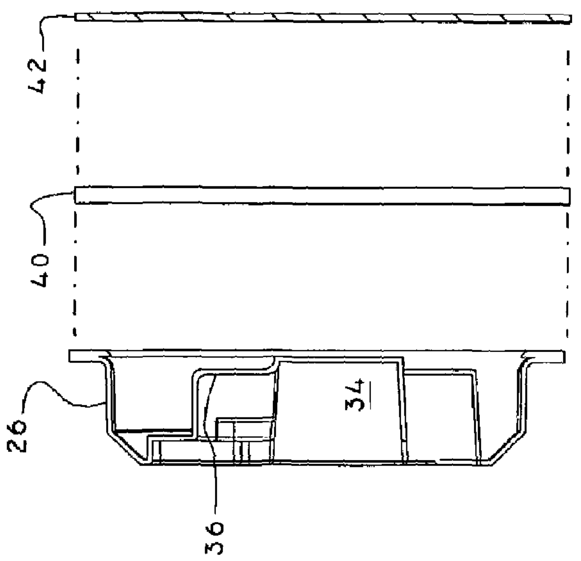
FIG. 3 is a section taken from FIG. 2 at the location indicated.
Figure 2:
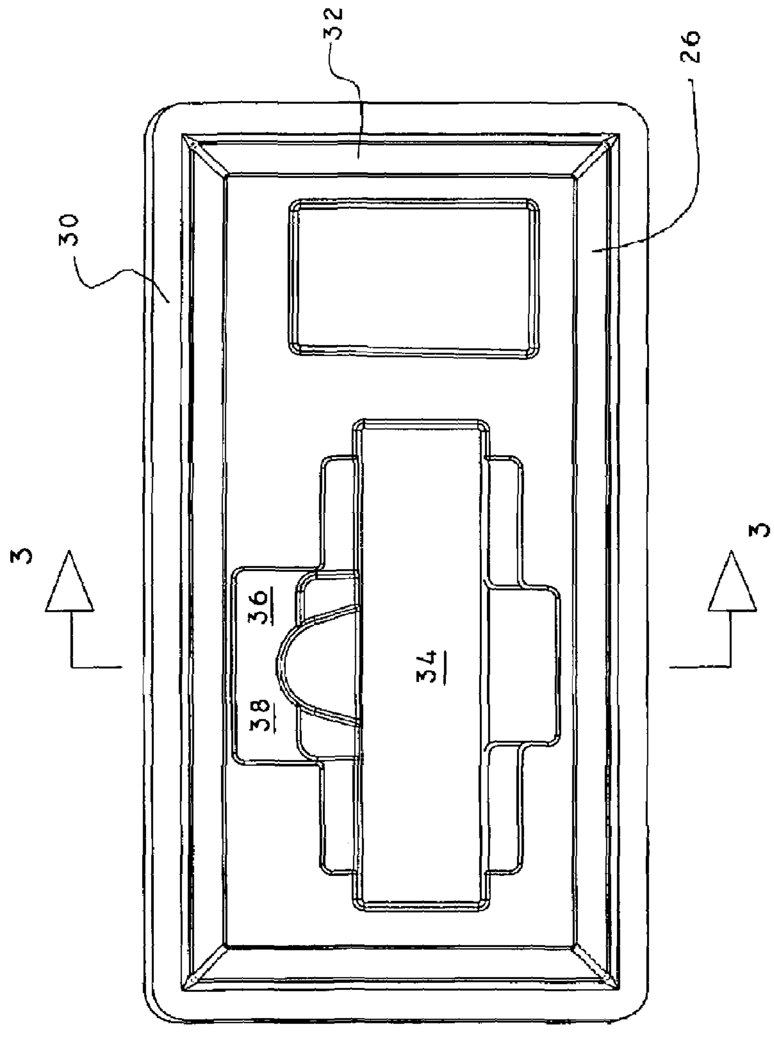
FIG. 2 is a plan view of the base.

Turning to FIGS. 2 and 3 it will be understood that the upper surface 32 will include a first recessed area 34 that is adapted for mating with the frame perimeter wall 18 by producing a first interference fit between the frame perimeter wall 18 and the hollow base 26. The phrase "interference fit" as used here refers to the well-known meaning of this term, which means that one of the mating components will deform when the mating component is inserted. In disclosed invention, the hollow base 26 will preferably be made from a resilient plastic material that will deform elastically when the vise 12 is inserted, and thus provide firm support for the vise.

As illustrated, the second recessed area 36 is adapted for mating with the jaw perimeter surface 15 by producing a second interference fit between the hollow base and the jaw perimeter surface 15 when the stationary jaw 14 is inserted into the second recessed area 36. As illustrated in FIG. 2, the second recessed area 36 will preferably extend from the first recessed area 34. This arrangement allows the combined, coextensive recessed areas, to cooperate in supporting the vise, such that a portion of the first recessed area 34 and the second recessed area 36 cooperate to produce the second interference fit with the jaw perimeter surface 15. Still further, FIG. 2 illustrates that the second recessed area 36 also includes a bottom 38 that contacts the end 24 of the stationary jaw 14 when the stationary jaw 14 is fully inserted into the second recessed area 36.

A base panel 40 will be attached to the entire planar flange 30 of the base perimeter wall 28 such that the upper surface 32 and the base panel 40 are spaced apart from one another. In order to provide friction over a support surface, such as a table or bench-top, a layer of flexible high friction material 42, preferably a polymer, or rubber or rubbery material, is attached to the base panel 40. This arrangement allows the first recessed area to support the vise in a generally horizontal position for allowing items to extend up, away from the support surface. Moving the vise to a vertical orientation then allows the second recesses area to support the vise in a generally vertical position, allowing the vise to be used as a press, for example. FIG. 4 also illustrates that it is contemplated that at least portions of the recessed areas 44 will extend to the same level as the planar flange 30 and thus allow attachment to the base panel 40 to provide further support to the base panel 40.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A vise and base system comprising:

a vise having a stationary jaw, a frame with a frame perimeter wall and a moveable jaw, the stationary jaw being fixed to the frame, and the moveable jaw being slideable along the frame, the stationary jaw having a stationary jaw perimeter surface that extends away from the frame;

a hollow base, the base having a base perimeter wall and an upper surface, the upper surface having a first recessed area that is adapted for mating with the frame perimeter wall by producing a first interference fit between the frame perimeter wall and the hollow base, and a second recessed area that is adapted for mating with the jaw perimeter surface by producing a second interference fit between the hollow base and the jaw perimeter, the second recessed area extending from the first recessed area such that a portion of the first recessed area and the second recessed area cooperate to produce the interference fit with the jaw perimeter;

a base panel that is attached to the base perimeter wall, such that the upper surface and the base panel are spaced apart; and a layer of flexible high friction material attached to the base panel such that the base panel extends between the upper surface and the layer of flexible high friction material, so that the first recessed area supports the vise in a generally horizontal position, and the second recesses area supports the vise in a generally vertical position.

2. A vise and base system according to claim 1 where said high friction material comprises a polymer material having a high coefficient of friction.

3. A vise and base system according to claim 1 wherein said hollow base is resilient and of unitary, one-piece construction.

4. A vise and base system according to claim 3 wherein said hollow base further comprises a planar flange that extends along the entire base perimeter wall, and said base panel is attached to the entire flange and at least portions of the recessed areas.

5. A vise and base system comprising:

a vise having a stationary jaw, a frame with a frame perimeter wall and a moveable jaw, the stationary jaw being fixed to the frame, and the moveable jaw being slideable along the frame, the stationary jaw having a stationary jaw perimeter surface by sides and an end that extend away from the frame;

a hollow base, the base having a base perimeter wall that includes a planar flange that follows the entire base perimeter wall, the base perimeter wall further comprising an upper surface that is spaced apart from the planar flange, the upper surface having a first recessed area that is adapted for mating with the frame perimeter wall by producing a first interference fit between the frame perimeter wall and the hollow base, and a second recessed area that is adapted for mating with the jaw perimeter surface by producing a second interference fit between the hollow base and the jaw perimeter, the second recessed area extending from the first recessed area such that a portion of the first recessed area and the second recessed area cooperate to produce the second interference fit with the jaw perimeter, the second recessed area further having a bottom that contacts the end of the stationary wall when the stationary jaw is fully inserted into the second recessed area;

a base panel that is attached to the entire planar flange of the base perimeter wall such that the upper surface and the base panel are spaced apart the base panel being; and a layer of flexible high friction material attached to the base panel such that the base panel extends between the upper surface and the layer of flexible high friction material, so that the first recessed area supports the vise in a generally horizontal position, and the second recesses area supports the vise in a generally vertical position.

6. A vise and base system according to claim 5 where said high friction material comprises a polymer material having a high coefficient of friction.

7. A vise and base system according to claim 6 wherein said hollow base is resilient and of unitary, one-piece construction.

8. A vise and base system according to claim 7 wherein said hollow base is contiguous with the first recessed area and the second recessed area, such that the first recessed area and the second recessed area do not extend through the hollow base.

* * * * *